(12) United States Patent
Hochbaum et al.

(10) Patent No.: US 7,609,967 B2
(45) Date of Patent: Oct. 27, 2009

(54) METHOD AND APPARATUS FOR AUTOMATICALLY UPGRADING PASSIVE OPTICAL NETWORKS (PONS)

(75) Inventors: Simon Hochbaum, Santa Rosa, CA (US); Eli Elmoalem, Nili (IL); Doron Tal, Kfar Shmaryahn (IL); David Ivancovsky, Maccabim (IL)

(73) Assignee: Broadlight Ltd. (IL)

( * ) Notice: Subject to any disclaimer, the term of this patent is extended or adjusted under 35 U.S.C. 154(b) by 634 days.

(21) Appl. No.: 11/400,380

(22) Filed: Apr. 10, 2006

(65) Prior Publication Data
US 2006/0275036 A1 Dec. 7, 2006

Related U.S. Application Data

(60) Provisional application No. 60/687,442, filed on Jun. 6, 2005.

(51) Int. Cl.
*H04J 10/00* (2006.01)
*H04J 14/08* (2006.01)
(52) U.S. Cl. .................. 398/67; 398/66; 398/70; 398/71; 398/72; 398/98; 398/99; 398/100
(58) Field of Classification Search ........... 398/66, 398/67, 70, 71, 72, 98, 99, 100
See application file for complete search history.

(56) References Cited

U.S. PATENT DOCUMENTS

| 6,229,788 | B1 | 5/2001 | Graves et al. |
| 6,385,366 | B1 | 5/2002 | Lin |
| 6,760,391 | B1* | 7/2004 | Alb et al. .................. 375/354 |
| 6,832,046 | B1* | 12/2004 | Thomas ....................... 398/72 |
| 2003/0058505 | A1 | 3/2003 | Arol et al. |
| 2004/0184810 | A1* | 9/2004 | Spilman et al. ............. 398/139 |
| 2004/0202470 | A1 | 10/2004 | Lim et al. |
| 2004/0208631 | A1 | 10/2004 | Song et al. |
| 2004/0218534 | A1 | 11/2004 | Song et al. |
| 2004/0264961 | A1 | 12/2004 | Nam et al. |
| 2006/0133809 | A1* | 6/2006 | Chow et al. ................ 398/66 |
| 2006/0153222 | A1* | 7/2006 | Van Caenegem et al. .... 370/445 |
| 2008/0050118 | A1* | 2/2008 | Haran et al. ............... 398/63 |

OTHER PUBLICATIONS

U.S. Appl. No. 11/238,022, filed Sep. 29, 2005, Specifications attached.

* cited by examiner

*Primary Examiner*—Ken N Vanderpuye
*Assistant Examiner*—Daniel G Dobson
(74) *Attorney, Agent, or Firm*—Myers Wolin, LLC

(57) ABSTRACT

An apparatus automatically maintains bi-directional communication between an optical network unit (ONU) and a central office (CO) in a passive optical network (PON) when the CO changes from a first PON mode to a second PON mode. The apparatus senses a PON mode relating to downstream data flow from the CO to the ONU; and upon detecting a change in the PON mode from the first PON mode to the second PON mode, synchronizes the ONU to operate according to the downstream and upstream configurations of the second PON mode.

27 Claims, 5 Drawing Sheets

|  | BPON | EPON | GPON |
|---|---|---|---|
| Standard | ITU-T G.983.1<br>ITU-T G.983.3 | IEEE 802.3ah | ITU-T G.984.2 |
| Line-code | Scrambled NRZ (section 8.2.1 Table 4) | Balanced 8B/10B NRZ | Scrambled NRZ (section 8.2.4) |
| Downstream wavelength | 1480nm-1500nm | 1480nm-1500nm | 1480nm-1500nm |
| Downstream Line-rate | 1.244 Gbit/s<br>622.08 Mbit/s<br>155.52 Mbit/s | 1.25Gbit/s | 2.488Gbit/s<br>1.244Gbit/s |
| Upstream wavelength | 1260nm-1360nm | 1260nm-1360nm | 1260nm-1360nm |
| Upstream Line-rate | 622.08 Mbit/s<br>155.52 Mbit/s | 1.25Gbit/s | 1.244 Gbit/s<br>622.08 Mbit/s<br>155.52 Mbit/s |

METHOD AND APPARATUS FOR AUTOMATICALLY UPGRADING PASSIVE OPTICAL NETWORKS (PONS)

CROSS-REFERENCE TO RELATED APPLICATION

This application claims the benefit of U.S. Provisional Patent Application No. 60/687,442 filed on Jun. 6, 2005, the contents of which are wholly incorporated herein by reference.

REFERENCES

Patents and Published Applications

| | | |
|---|---|---|
| 6,229,788 | May 2001 | Graves, et al. |
| 6,385,366 | May 2002 | Lin |
| 20030058505 | March 2003 | Arol; et al. |
| 20040202470 | October 2004 | Se-Youn; et al. |
| 20040208631 | October 2004 | Jae-Yeon; et al. |
| 20040218534 | November 2004 | Jae-Yeon; et al. |
| 20040264961 | December 2004 | Hong Soon; et al. |

Other References

1) IEEE 802.3ah
2) ITU-T G.984
3) ITU G.983

FIELD OF THE INVENTION

The present invention relates generally to passive optical networks (PONs), and more particularly to a method for automatically upgrading PONs.

BACKGROUND OF THE INVENTION

As the demand of users for bandwidth is rapidly increasing, optical transmission systems, where subscriber traffic is transmitted using optical networks, is installed to serve this demand. These networks are typically referred to as fiber-to-the-curb (FTTC), fiber-to-the-building (FTTB), fiber-to-the-premise (FTTP), or fiber-to-the-home (FTTH). Each such network provides an access from a central office (CO) to a building, or a home, via optical fibers installed near or up to the subscribers' locations. As the transmission quantity of such an optical cable is much greater than the bandwidth actually required by each subscriber, a passive optical network (PON) shared between a plurality of subscribers through a splitter was developed.

An exemplary diagram of a typical PON 100 is schematically shown in FIG. 1. The PON 100 includes M optical network units (ONUs) 120-1, 120-2, through 120-M, coupled to an optical line terminal (OLT) 130 via a passive optical splitter 140. To the extent that reference is made to the ONUs without regard to a specific one thereof, such ONUs will be referenced as 120. Traffic data transmission may be achieved, for example, by using asynchronous transfer mode (ATM) cells over two optical wavelengths, one for the downstream direction and another for the upstream direction. Other multiplexing methods are available such as Ethernet frames in EPON or data fragments in GPON. Downstream transmission from OLT 130 is broadcast to all ONUs 120. Each ONU 120 filters its respective data according to, for example, pre-assigned ATM VPI/VCI values. The ONUs 120 transmit respective data to the OLT 130 during different time slots allocated by the OLT 130 for each ONU 120. The splitter 140 splits a single line into multiple lines, for example 1 to 32.

In the related art, PONs are classified into one of the following: an ATM PON (APON), a broadband PON (BPON), an Ethernet PON (EPON or GE-PON), and a Gigabit PON (GPON). The APON uses the ATM protocol; the BPON is designed to provide broadband services over an ATM protocol; the EPON accommodates an Ethernet protocol; and the GPON is an evolution of BPON with higher speeds as well as the ability to accommodate various types of information (e.g., ATM, Ethernet, TDM, and so on) natively. Each type of PON is a standard technology.

The OLT 130 and ONUs 120 provide the interface between the optical network and homes or businesses, and thus define the type of the PON. For example, in order to establish a BPON the OLT 130 and ONUs 120 should be compatible with the BPON standards, ITU-T-G.983 series. ONU's components adapted to operate in a dual mode (e.g., BPON and GPON or EPON and GPON) or components that can function in a triple mode (e.g., BPON, GPON and EPON) are currently being developed. In a case where a mixed-mode ONU is utilized, the network type is determined by the OLT installed at the CO and the ONUs detect the mode of the PON supported by the OLT.

To save costs on infrastructure, service providers have installed mixed-mode ONUs in homes or businesses, and thus can upgrade, or provide additional services with minimal or without additional investments. Specifically, to upgrade the network from a first type of PON to a second type of PON, the OLT in the CO is replaced with an OLT that supports the second PON and mixed-mode ONUs are configured to operate in accordance with the second OLT. Presently, each ONU 120 has to be physically replaced, by a technician, when the mode and/or standard implemented on the PON changes. This is of course a time consuming and labor-intensive task that extends the time required for upgrading the network and involves significant costs for service providers. Furthermore, the labor intensive replacement of the ONUs 120 can result in prolonged interruption of services to the subscribers.

It would be, therefore, advantageous to provide a method for automatically upgrading ONUs to operate a new type of PON, and thus allowing the smooth migration between the different types of PON.

SUMMARY OF THE INVENTION

It is an object of the invention to provide a method for automatically upgrading a passive optical network (PON) from a first PON mode to a second PON mode.

This object is realized in accordance with a first aspect of the invention by a method for automatically maintaining bi-directional communication between an optical network unit (ONU) and a central office (CO) in a passive optical network (PON) when the CO upgrades from a first optical line terminal (OLT) having a first PON mode to a second OLT having a second PON mode, the method comprising:

obtaining a PON mode relating to downstream data flow from the OLT to the ONU; and upon detecting a change in said PON mode from the first PON mode to the second PON mode:

synchronizing said ONU to operate according to a downstream configuration of the second PON mode; and synchronizing said ONU to operate according to an upstream configuration of the second PON mode.

In accordance with a second aspect of the invention there is provided a method for automatically upgrading a passive optical network (PON) having an optical network unit (ONU) coupled via a first splitter to a first optical line terminal (OLT) in a central office (CO), so as to maintain bi-directional communication between the ONU and the CO when the CO changes from a first PON mode to a second PON mode, the method comprising:

installing in the CO a second OLT capable of operating in said second PON mode;
    connecting a second splitter between the second OLT and the ONU;
    connecting the second OLT to said second splitter;
    connecting the ONU to the second splitter; and
    automatically activating said ONU in said second PON mode.

In accordance with a third aspect of the invention there is provided an apparatus for automatically maintaining bi-directional communication between an optical network unit (ONU) and a central office (CO) in a passive optical network (PON) when the CO upgrades from a first optical line terminal (OLT) having a first PON mode to a second OLT having a second PON mode, said apparatus comprising:

a sensor couplable to the ONU for sensing a PON mode relating to downstream data flow from the CO to the ONU;
    a downstream configuration synchronizer coupled to the sensor and responsive to a change in said PON mode from the first PON mode to the second PON mode for synchronizing said ONU to a downstream configuration of the second PON mode; and
    an upstream configuration synchronizer coupled to the sensor and responsive to a change in said PON mode from the first PON mode to the second PON mode for synchronizing said ONU to an upstream configuration of the second PON mode.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF EMBODIMENTS

In accordance with the disclosed invention a method for automatically upgrading passive optical networks (PONs) from a first PON mode to a second PON mode is used. Each of the first and second PON modes include, but are not limited to, an Ethernet PON (EPON), a Gigabit PON (GPON), and a broadband PON (BPON). The method enables the changing of an operating PON by automatically configuring each optical network unit (ONU), with no service impact on other subscribers. The ONU utilized for this purpose is a mixed-mode ONU which is capable of processing more than one, but not limited to the following EPON, BPON and GPON traffic. By installing mixed-mode ONUs at end-user sites and invoking the method disclosed herein, service providers can significantly reduce the network shutdown time and costs involved with the upgrading of their networks.

Figure 1:
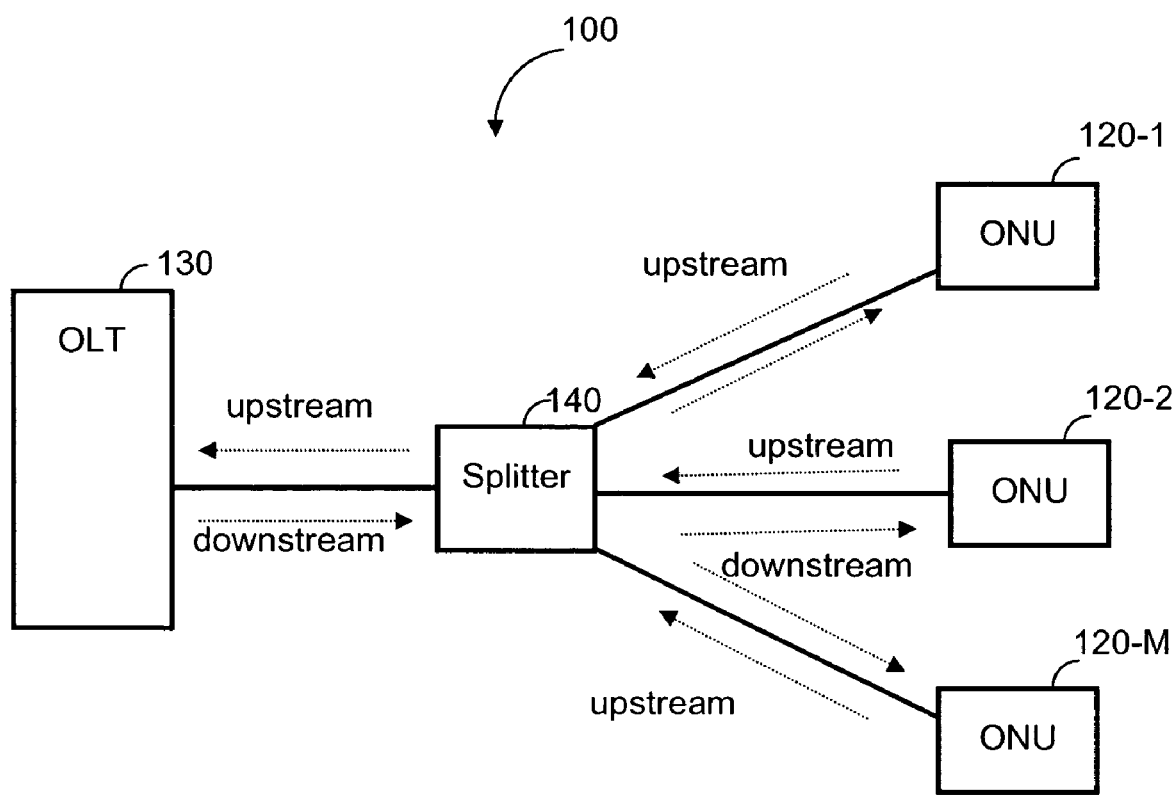
FIG. 1 is an schematically diagram of a typical prior art PON.
Figure 2A:
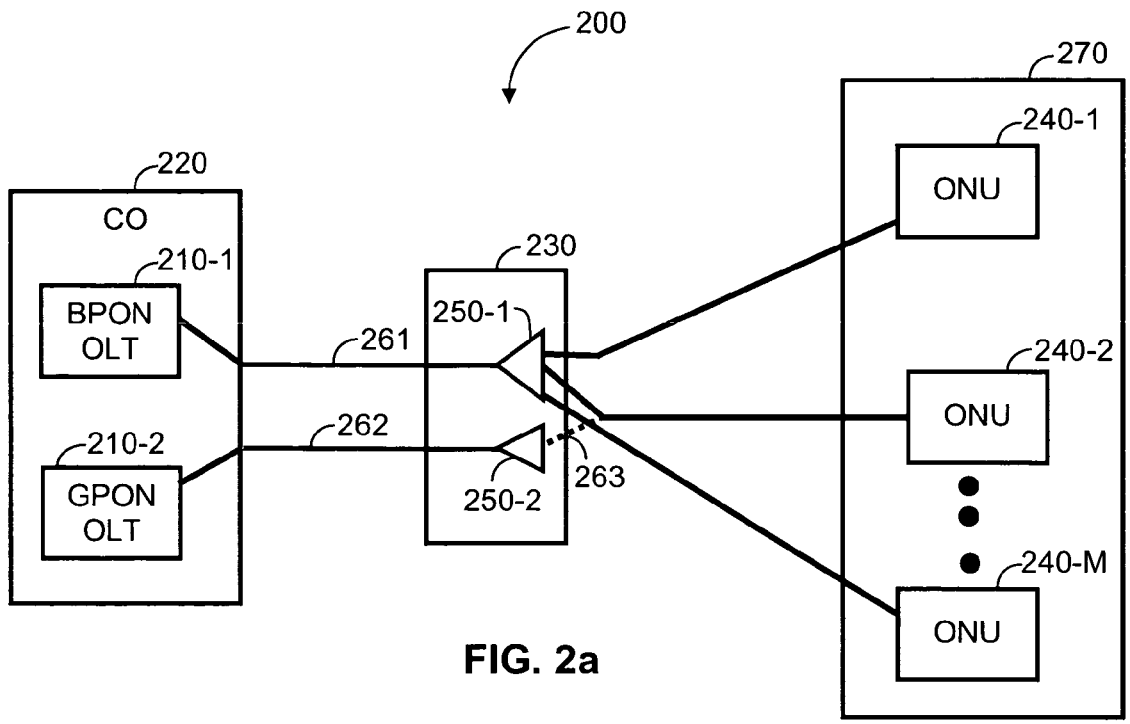
FIG. 2 is a diagram of a PON illustrating the process for upgrading a PON.

FIG. 2a shows a non-limiting diagram of a PON 200, illustrating the process for upgrading PONs. For the purpose of this example the current operation mode of the PON 200 is BPON and it is upgraded to GPON mode. The PON 200 includes a BPON OLT 210-1 and a GPON OLT 210-2 both installed at a central office (CO) 220, a splitter hub 230, and M ONUs 240-1 through 240-M located in a service area 270. The ONUs 240 are mixed-mode ONUs which are capable of processing traffic of at least the two different PON modes. In one configuration, each ONU 220 may include a PON processor adapted to serve a plurality of PON applications. An example for such PON processor may be found in U.S. patent application Ser. No. 11/238,022 filed Sep. 29, 2005 and commonly assigned to the same assignee as the present application, and which is hereby incorporated for all that it contains.

In order to upgrade PON 200 to provide GPON services, a GPON OLT 210-2 is installed and tested in the CO 220. A new splitter 250-2 is allocated in the splitter hub 230 and a fiber strand 262 is wired between the splitter 250-2 and the GPON OLT 210-2. Once a subscriber orders GPON services, a fiber strand 263 from an ONU 240-2 (i.e., from the subscriber home) is patched from the splitter 250-1 to the splitter 250-2. It should be noted that only the ONU 240-2 is switched from splitter 250-1 to the new splitter 250-2, and thus the service interruption affects only the subscriber(s) serviced by the ONU 240-2. Subsequently, a process for re-activating the ONU 240-2 in the GPON mode is applied. As will be described in greater detail below, this process automatically configures the ONUs to operate in the new mode.

Figure 2B:
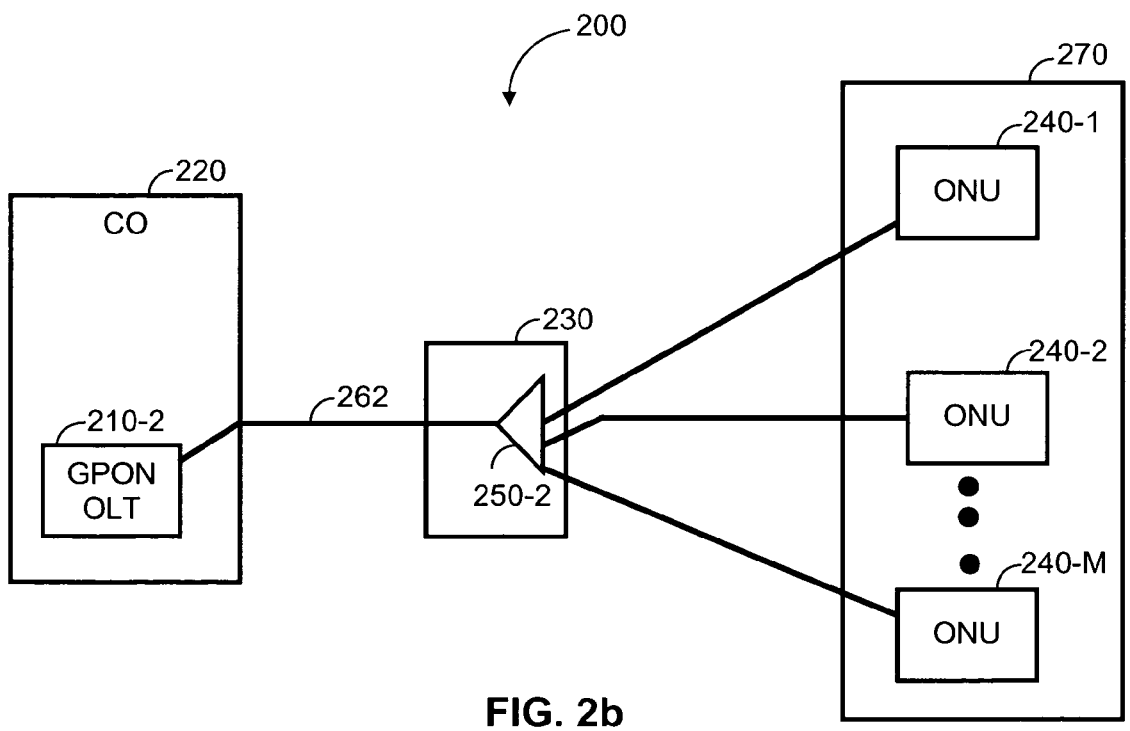

FIG. 2b shows the PON 200 once all ONUs 240 have been transferred to the GPON mode. As can be seen, the BPON OLT 210-1, the splitter 250-1 and the fiber 261 are no longer necessary, and therefore removed from the PON 200.

Figure 3:
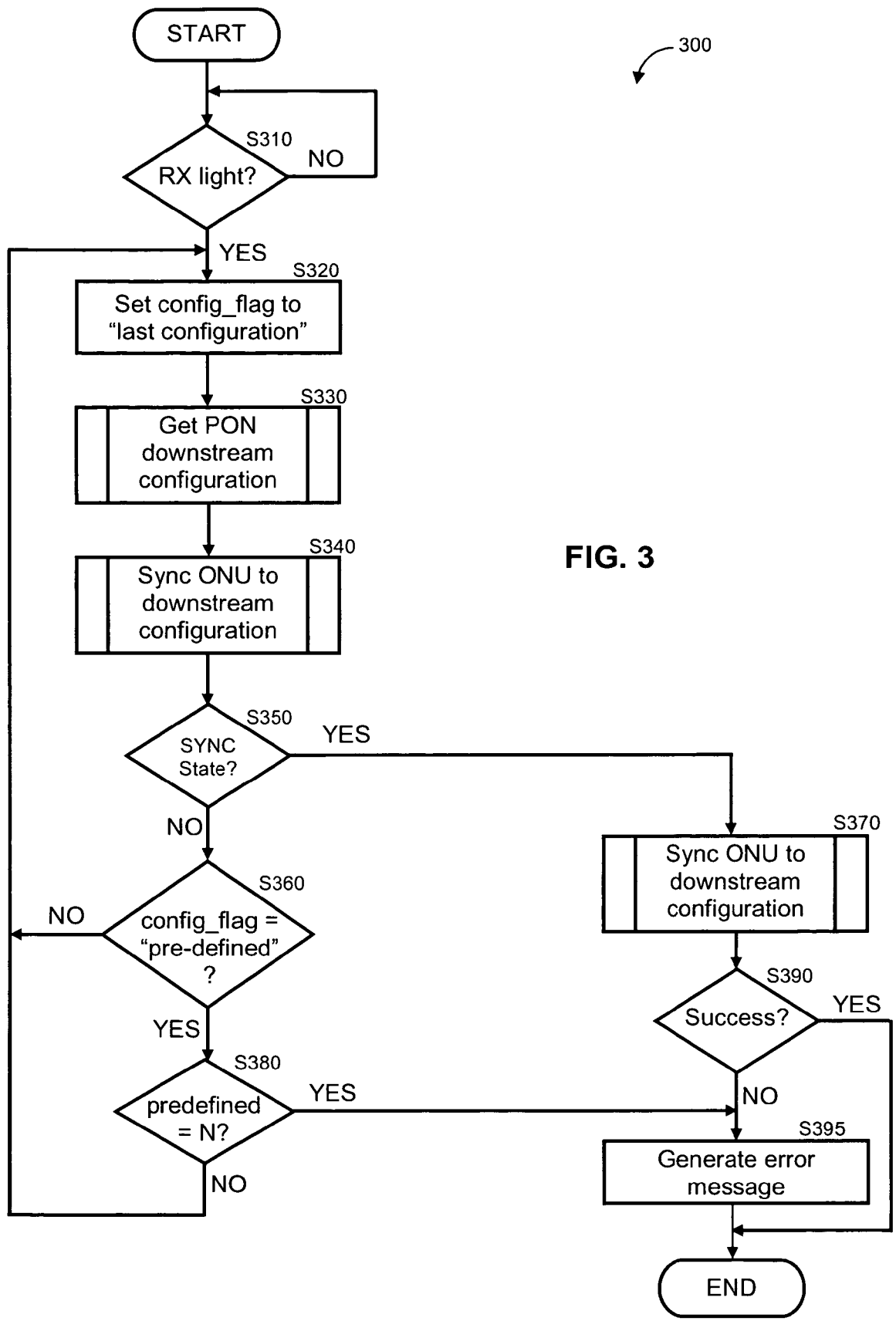
FIG. 3 is a flowchart describing the method for automatically activating a mixed-mode ONU to operate in a new PON mode in accordance with one embodiment of the present invention.

Referring to FIG. 3, there is shown a non-limiting flowchart 300, describing the method for automatically activating a mixed-mode ONU to operate in a new PON mode, in accordance with one embodiment of the present invention. The method will be described herein with reference to a specific embodiment of the invention where the ONU is a triple-mode ONU equipped to handle GPON, BPON, and EPON traffic. However, other embodiments will be apparent to those of ordinary skill in the art. For example, the mixed-mode ONU may be adapted to double-mode ONU utilizing the standards of EPON and GPON or BPON and GPON, or any other combination, or to any multi-mode ONU accommodating multiple PON standards, existing or future.

The triple-mode ONU automatically recognizes the line-code (i.e., a code chosen for use within a communications system for transmission purposes) and the line-rate (i.e., the transmission rate) that are active on the PON. The EPON, BPON, and GPON modes are defined in different standards, each of which determines its own line-codes as well as downstream and upstream line-rates. The line-rates and line codes of the various PON standards are tabulated in FIG. 5.

At S310, it is checked if a light signal is received at the ONU, and if so execution proceeds to S320; otherwise, execution waits until such a signal is detected. At S320, a configuration flag (hereinafter the "config_flag"), which indicates the tested configuration (i.e., a line-code and a line-rate) of the optical network is initialized to a string value pointing to "last configuration". At S330, the PON downstream configuration is retrieved according to the value of the config_flag. Each time execution reaches this step a different set of configuration values is retrieved.

Figure 4:
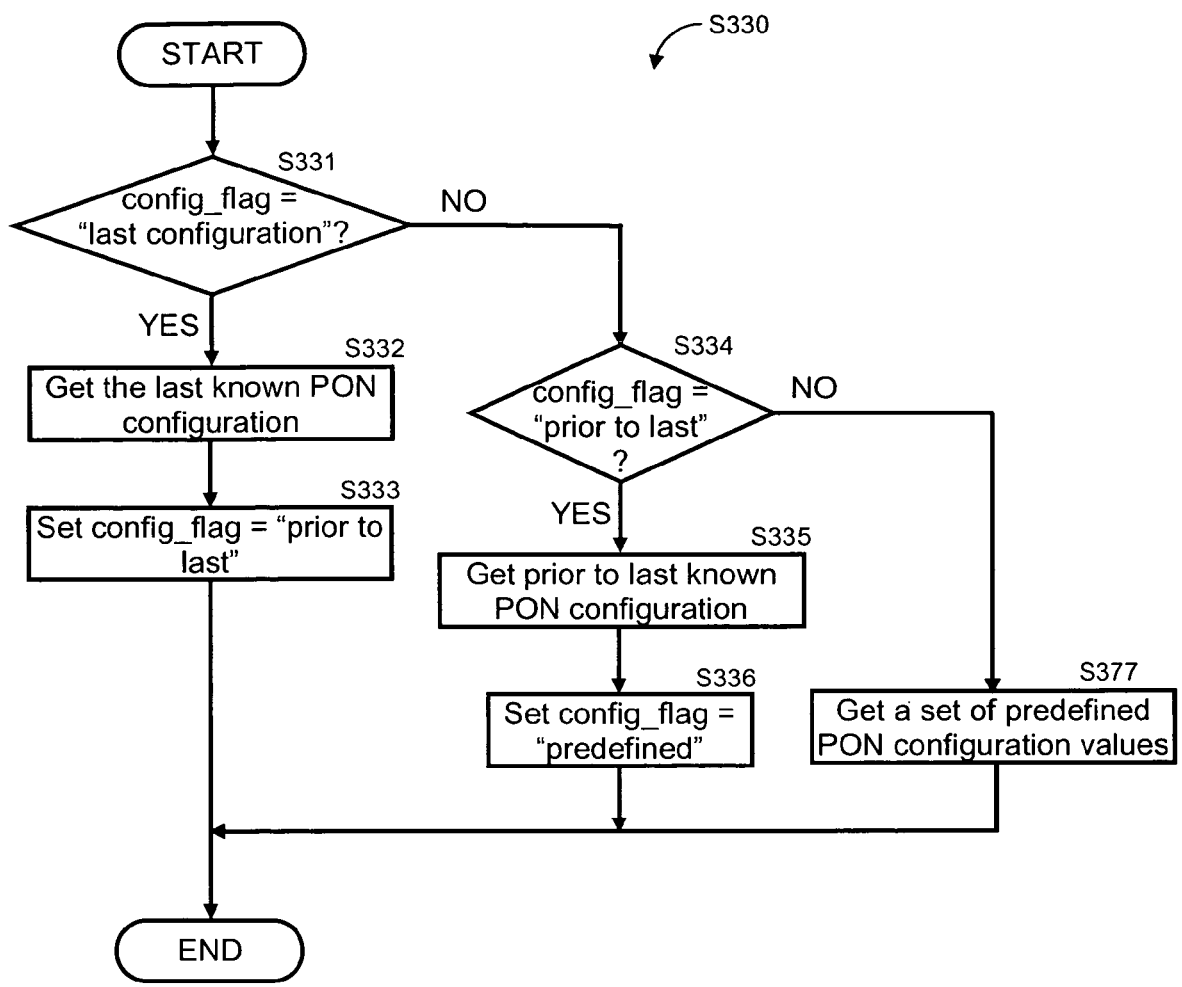
FIG. 4 is a flowchart describing the step for retrieving a PON configuration in accordance with one embodiment of the present invention.

FIG. 4 shows the execution of step S330 in greater detail. The PON downstream configuration is obtained from the configuration register to allow the synchronization of an ONU to operate in the line-code and the downstream line-rate of the PON. Specifically, the method first tries to synchronize an ONU according to the PON's latest operating line-code and downstream line rates. If the ONU is unsynchronized, then there is an attempt to try to connect again with the PON configuration used prior to the latest setting. After the second attempt, if the ONU is still unsynchronized, an attempt is made to synchronize the ONU according to the line rates and line-codes that are pre-defined in the internal registers and memory of the ONU.

At S331, it is checked if config_flag equals to "last configuration" and if so, at S332, the last known working configuration of the PON is retrieved. Then, at S333, config_flag is set to a string value "prior to last". If S331 results with an affirmative answer, execution continues with S334 where it is checked if config_flag equals to "prior to last". If so, at S335, the working configuration of the PON prior to the last known configuration is retrieved, and at S336 config_flag is set to "pre-defined". If S334 results in a negative answer, then at S337 the various combinations of downstream line-rates and line codes as defined in the ONT configuration for the new mode(s) are retrieved. As an example, the GPON standard defines the different line rates: 2.4xx Gbit/s and 1.244 Gbit/s, each operative with a scrambled non return to zero (NRZ) line-code.

Referring back to FIG. 3, execution continues with S340 where an attempt is made to synchronize the ONU to the downstream configuration retrieved at S330. The ONU is considered successfully synchronized if it reaches its SYNC state. The definition of a SYNC state varies from one PON standard to another. For example, the SYNC state of an EPON is reached when a correct multi-point control protocol (MPCP) frame is received, the SYNC state of a GPON is accomplished when a received value of a physical synchronize field (Psync) is correct, and the SYNC state of BPON is reached once a correct synchronization frame is received. A detail description of the SYNC state can be found in the respective standards IEEE 802.3ah, ITU-T G.984, and ITU G.983, each of which is incorporated herein by reference for all they contain. At S350, it is checked if the ONU reaches the SYNC state, and if so execution continues with S370; otherwise, execution continues with S360 where another check is made to determine if config_flag equals a string value "pre-defined". If the value of config_flag is different than "pre-defined", execution returns to S330 to retrieve a different set of configuration values; otherwise, execution continues with S380, where it is checked whether the whole set of pre-defined configurations were tested, and if so execution ends; otherwise, execution returns to S330 where a new set of a predefined configuration values is retrieved.

Figures 5, 6:
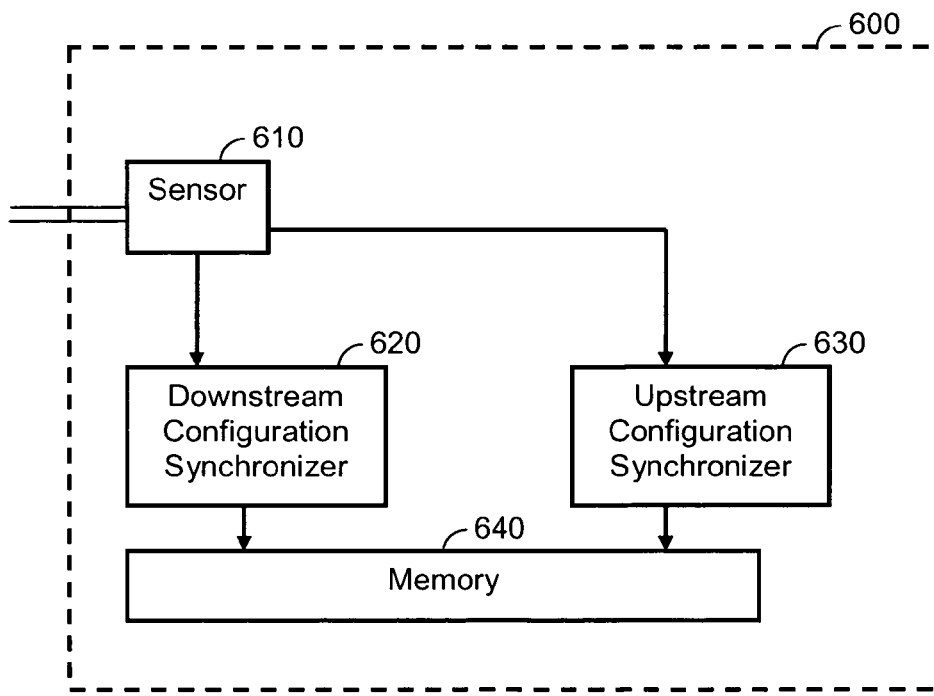
FIG. 5 is a table that lists the prior art line-rates and line-codes defined in the EPON, GPON and BPON standards.
FIG. 6 is a block diagram showing functionality of an apparatus designed for implementing the process for automatically activating an ONU to operate in a new PON in accordance with one embodiment of the present invention.

At S370, the ONU is synchronized to the upstream line-rate and line-code of the OLT. Generally, all types of PONs are point-to-multipoint networks, where the upstream traffic is controlled by the OLT, and thus the ONUs are governed to transmit at line-rate compliant with the OLT. In most PON architectures, the upstream line-rate is determined according to downstream rate, i.e., a PON is configured with a pair of upstream and downstream line-rates. Specifically, for the EPON a single upstream line-rate is defined (as shown in FIG. 5), and thus this rate is always chosen. In PONs for which such a pair of line-rates does not exist, the method automatically detects the upstream line-rate. The BPON standard allows two different upstream rates (622.08 Mbit/s and 155.52 Mbit/s) and the GPON standard defines three line rates. Accordingly, an ONU upstream line-rate is determined by utilizing a ranging process. The ranging process is used to adjust the timing of each ONU to compensate for the differential distance from the OLT to the ONUs. The ranging process is further discussed in the GPON and BPON standards. The method of the present invention selects a first upstream line-rate (e.g., 155.52 Mbit/s for BPON) and applies the ranging process. If the process fails after a pre-determined number of connection attempts, another upstream line-rate is selected (e.g., 622.08 Mbit/s for BPON) and the ranging process is applied once more. If the ranging process does not fail, the ONU is synchronized to the selected upstream line-rate. It should be noted that the upstream line-rate cannot be higher than the downstream line-rate. The upstream line-code is the same as the downstream line-code. The ONU upstream transceiver is configured to the upstream line-code which changes from a first PON to a second PON mode.

At S390, it is checked as to whether the ONU is successfully synchronized to the upstream line-rate, and if so the configuration of the ONU ends and it is ready to operate in the new mode; otherwise, execution continues with S395 where an internal error message is generated, indicating that the ranging of the ONU should go again through the possible values of the upstream line-rate. In one embodiment of the present invention, the activation process is restarted if an internal error message is generated.

The methods described herein can be executed in two scenarios: 1) warm ONU, and 2) cold ONU. In the warm ONU, the activation is performed if a fiber (e.g., fiber 261) were disconnected or the OLT were restarted. In the cold-ONU activation is performed if ONU were restarted. It is further noted that the method may be implemented in software, firmware, hardware, or any combination thereof. Thus, hardware or firmware may be embedded within the ONU for sensing a change in PON mode and synchronizing the downstream and upstream PON configurations. Alternatively, a standalone apparatus may be coupled to the ONU for sensing a change in the downstream PON configuration and synchronizing the downstream and upstream PON configurations to the new PON mode.

FIG. 6 shows a non-limiting block diagram of such an apparatus 600 operative in an ONU and designed for implementing the process for automatically activating an ONU to detect and operate in one of multiple PON modes supported by the ONU. The apparatus 600 includes a sensor 610 connected to fiber originating from a splitter (e.g., splitter 250), a downstream configuration synchronizer 620, an upstream configuration synchronizer 630, and a memory unit 640, which stores the upstream configurations and the downstream configurations of the PON. The memory unit 640 may optionally be an external unit coupled to the downstream and upstream configuration synchronizers. The sensor 610 senses the optic fiber to check if a light signal is received. Once the signal is received, the sensor 610 detects the mode of the PON as supported by the OLT. The downstream configuration synchronizer 620 retrieves the downstream configuration of the detected PON mode and tries to reach a SYNC state. Specifically, the synchronizer 620 first tries to synchronize to an ONU according to the PON's latest operating line-code and downstream line rates. If the ONU is unsynchronized, the synchronizer 620 again tries to synchronize again with the PON configuration used prior to the latest setting. After the second attempt, if the ONU is still unsynchronized, the synchronizer 620 attempts to synchronize the ONU according to the line rates and line-codes that are pre-defined in the memory unit 640. The upstream configuration synchronizer 630 synchronizes to the upstream line-rate and line code of the OLT.

The apparatus may be a suitably programmed computer, in which case the functionality of the downstream configuration synchronizer and the upstream configuration synchronizer may be implemented by the CPU of the computer. Likewise, the invention contemplates a computer program being readable by a computer for executing the method of the invention. The invention further contemplates a machine-readable memory tangibly embodying a program of instructions executable by the machine for executing the method of the invention.

It will be appreciated that modifications can be made to the manner of carrying out the invention without departing from the scope thereof as defined in the appended claims. For example, in the embodiments described, a change in PON mode is sensed by retrieving the PON mode from a data packet that is communicated downstream from the CO to the ONU. This assumes that the PON mode appears in a header that is pre-pended to a downstream data packet and is readable by a mixed-mode ONU regardless of to which PON mode it is configured to operate. Alternatively, a change in PON mode may be inferred by an inability to read a downstream data packet and the new PON mode of the CO may then be determined by trial and error, i.e. by setting the PON mode of the ONU to different modes until the downstream data packet can be read.

The invention claimed is:

1. A method for automatically maintaining bi-directional communication between an optical network unit (ONU) and a central office (CO) in a passive optical network (PON) when the CO upgrades from a first optical line terminal (OLT) having a first PON mode to a second OLT having a second PON mode, the method comprising:
   obtaining a PON mode relating to downstream data flow from the OLT to the ONU; and
   upon detecting a change in said PON mode from the first PON mode to the second PON mode:
   synchronizing said ONU to operate according to a downstream configuration of the second PON mode by performing:
      attempting to synchronize the ONU according to a last-known downstream configuration of the PON;
      when the ONU is unsynchronized, attempting to try to connect again with a downstream configuration used prior to the last-known setting;
      when the ONU is still unsynchronized, attempting to synchronize the ONU according to the line rates and line-codes that are pre-defined in the ONU; and
   synchronizing said ONU to operate according to an upstream configuration of the second PON mode.

2. The method of claim 1, wherein said first PON mode is a broadband PON (BPON) or an Ethernet PON (EPON).

3. The method of claim 2, wherein said second PON mode is at least a Gigabit PON (GPON).

4. The method of claim 1, wherein said first PON mode is an EPON or a GPON.

5. The method of claim 4, wherein said second PON mode is a BPON.

6. The method of claim 1, wherein said first PON mode is a BPON or a GPON.

7. The method of claim 6, wherein said second PON mode is an EPON.

8. The method of claim 1, wherein said downstream configuration comprises a line-code and a downstream line-rate.

9. The method of claim 8, wherein retrieving said downstream configuration further comprises:
   obtaining at each time one of the following: a last known configuration of the PON, a prior to last known configuration of the PON, a predefined standard configuration.

10. The method of claim 9, wherein said ONU is synchronized if it is reaches a SYNC state as defined in the respective second PON mode.

11. The method of claim 10, further comprising checking if said ONU reached the SYNC state prior to synchronizing said upstream configuration.

12. The method of claim 1, wherein said upstream configuration comprises an upstream line-rate.

13. The method of claim 12, including determining said upstream line-rate using a ranging process.

14. The method of claim 1, further comprising generating an error message if said ONU fails to synchronize.

15. A program storage device readable by machine, tangibly embodying a program of instructions executable by the machine to perform a method for automatically maintaining bi-directional communication between an optical network unit (ONU) and a central office (CO) in a passive optical network (PON) when the CO upgrades from a first optical line terminal (OLT) having a first PON mode to a second OLT having a second PON mode, the method comprising:
   detecting a change in PON mode relating to downstream data flow from the CO to the ONU; and
   synchronizing said ONU to operate according to a current downstream configuration by performing:
      attempting to synchronize the ONU according to a last-known downstream configuration of the PON;
      when the ONU is unsynchronized, attempting to try to connect again with a downstream configuration used prior to the last-known setting; and
      when the ONU is still unsynchronized attempting to synchronize the ONU according to the line rates and line-codes that are pre-defined in the ONU; and
   synchronizing said ONU to operate according and a current upstream configuration of the second PON mode.

16. The program storage device of claim 15, wherein said first PON mode is a broadband PON (BPON) or an Ethernet PON (EPON).

17. The program storage device of claim 16, wherein said second PON mode is a Gigabit PON (GPON).

18. The program storage device of claim 15, wherein said first PON mode is an EPON or a GPON.

19. The program storage device of claim 18, wherein said second PON mode is a BPON.

20. The program storage device of claim 15, wherein said first PON mode is at BPON or a GPON.

21. The program storage device of claim 20, wherein said second PON mode is an EPON.

22. The program storage device of claim 15, wherein said downstream configuration comprises at least: a line-code, a downstream line-rate.

23. The program storage device of claim 15, wherein the ONU is synchronized if a SYNC state is reached as defined in the respective second PON mode.

24. The program storage device of claim 23, further including checking if the ONU reached the SYNC state prior to synchronizing said upstream configuration.

25. The program storage device of claim 15, wherein said upstream configuration comprises an upstream line-rate an upstream line-rate.

26. The program storage device of claim 25 wherein said upstream line-rate is determined by a ranging process.

27. The program storage device of claim 15, wherein said method further comprises generating an error message if said ONU is failed to synchronized.

* * * * *